US012749772B2

(12) United States Patent
Morishima

(10) Patent No.: US 12,749,772 B2
(45) Date of Patent: Sep. 29, 2026

(54) NON-AQUEOUS ELECTROLYTE SECONDARY BATTERY

(71) Applicant: Panasonic Energy Co., Ltd., Moriguchi (JP)

(72) Inventor: Hideki Morishima, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 631 days.

(21) Appl. No.: 18/265,352

(22) PCT Filed: Nov. 30, 2021

(86) PCT No.: PCT/JP2021/043878

§ 371 (c)(1),
(2) Date: Jun. 5, 2023

(87) PCT Pub. No.: WO2022/124142

PCT Pub. Date: Jun. 16, 2022

(65) Prior Publication Data

US 2024/0055731 A1 Feb. 15, 2024

(30) Foreign Application Priority Data

Dec. 8, 2020 (JP) ................................ 2020-203499

(51) Int. Cl.
*H01M 50/489* (2021.01)
*H01M 10/04* (2006.01)

(52) U.S. Cl.
CPC ..... *H01M 50/489* (2021.01); *H01M 10/0431* (2013.01)

(58) Field of Classification Search
CPC ........................ H01M 50/489; H01M 10/0431
See application file for complete search history.

(56) References Cited

U.S. PATENT DOCUMENTS

2013/0084483 A1 4/2013 Lee et al.
2022/0052420 A1 2/2022 Tsukagoshi et al.

FOREIGN PATENT DOCUMENTS

JP 2013-218898 A 10/2013
JP 2014-056834 A 3/2014
(Continued)

OTHER PUBLICATIONS

WO2017014147 translation (Year: 2017).*
(Continued)

*Primary Examiner* — Jane J Rhee
(74) *Attorney, Agent, or Firm* — WHDA, LLP

(57) ABSTRACT

This non-aqueous electrolyte secondary battery is characterized by comprising: a wound electrode body in which a positive electrode and a negative electrode are wound via a separator. Said battery is also characterized in that: when the separator is divided into five parts in the width direction and the five divided regions are defined as a region A positioned on one end of the separator in the width direction, a region B positioned on the other end of the separator in the width direction, a region C positioned in the center of the separator in the width direction, a region D positioned between the region A and the region C, and a region E positioned between the region B and the region C, then the void ratio of the region D and the region E is greater than the void ratio of the region A, the region B, and the region C.

3 Claims, 2 Drawing Sheets

(56) References Cited

FOREIGN PATENT DOCUMENTS

| | | | |
|---|---|---|---|
| JP | 2014-509777 | A | 4/2014 |
| JP | 2016-001615 | A | 1/2016 |
| JP | 2019-186157 | A | 10/2019 |
| KR | 10-2014-0070240 | A | 6/2014 |
| KR | 10-2019-0127146 | A | 11/2019 |
| WO | 2016/174991 | A1 | 11/2016 |
| WO | 2017/014147 | A1 | 1/2017 |
| WO | 2020/066108 | A1 | 4/2020 |

OTHER PUBLICATIONS

JP2014056834 translation (Year: 2014).*

Extended Supplementary European Search Report dated Dec. 12, 2024, issued in counterpart Application No. 21903246.3. (7 pages).

International Search Report dated Feb. 1, 2022, issued in counterpart International Application No. PCT/JP2021/043878, with English Translation. (5 pages).

Written Opinion of the International Searching Authority (Form PCT/ISA/237) dated Feb. 1, 2022, issued in counterpart International Application No. PCT/JP2021/043878, (3 pages).

Office Action dated Mar. 26, 2026, issued in counterpart CN Application No. 202180081521.2, with partial English translation. (10 pages).

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/043878 filed on Nov. 30, 2021, which claims the benefit of priorities under 35 U.S.C. § 119 (a) of Japanese Patent Application No. 2020-203499 filed in Japan on Dec. 8, 2020, the contents of which are incorporated herein by reference.

TECHNICAL FIELD

The present disclosure relates to a non-aqueous electrolyte secondary battery.

BACKGROUND

In recent years, as a secondary battery having high output and high energy density, a non-aqueous electrolyte secondary battery including an electrode assembly in which a positive electrode and a negative electrode are wound with a separator interposed therebetween has been widely used.

For example, Patent Literature 1 proposes that a porosity of a porous filler layer at both ends of a separator in a width direction is set to be smaller than a porosity of a porous filler layer at the center portion in order to improve charge and discharge cycle characteristics of the battery.

CITATION LIST

Patent Literature

Patent Literature 1: JP 2013-218898 A

SUMMARY

Technical Problem

However, in the non-aqueous electrolyte secondary battery, further improvement of charge and discharge cycle characteristics is required.

Therefore, an object of the present disclosure is to provide a non-aqueous electrolyte secondary battery capable of suppressing deterioration of charge and discharge cycle characteristics.

Solution to Problem

According to one aspect of the present disclosure, a non-aqueous electrolyte secondary battery includes a wound electrode assembly in which a positive electrode and a negative electrode are wound with a separator interposed therebetween; and a non-aqueous electrolyte, in which the separator includes a porous substrate and a heat-resistant porous layer disposed on the porous substrate and facing at least one of the positive electrode and the negative electrode, and in a case where the separator is divided into five regions in a width direction and the five divided regions are defined as a region A positioned at one end of the separator in the width direction, a region B positioned at the other end of the separator in the width direction, a region C positioned at the center portion of the separator in the width direction, a region D positioned between the region A and the region C, and a region E positioned between the region B and the region C, a porosity of each of the region D and the region E is larger than a porosity of each of the region A, the region B and the region C.

Advantageous Effects of Invention

According to the present disclosure, it is possible to suppress the deterioration of the charge and discharge cycle characteristics.

DESCRIPTION OF EMBODIMENTS

Hereinafter, embodiments of the present disclosure will be described with reference to the drawings.

Figure 1:
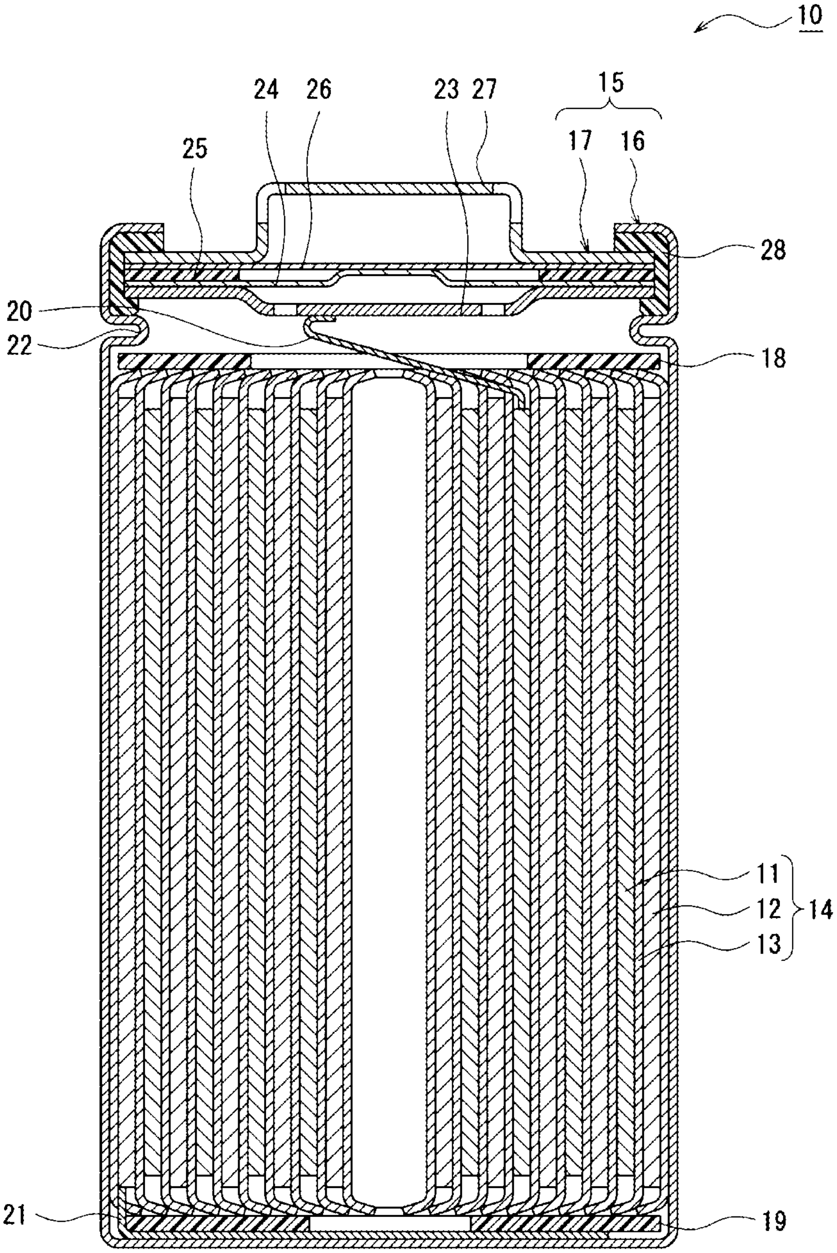
FIG. 1 is a cross-sectional view of a non-aqueous electrolyte secondary battery as an example of an embodiment.

FIG. 1 is a schematic cross-sectional view of a non-aqueous electrolyte secondary battery of an example of an embodiment. A non-aqueous electrolyte secondary battery 10 illustrated in FIG. 1 includes a wound electrode assembly 14 formed by wounding a positive electrode 11 and a negative electrode 12 with a separator 13 interposed between the positive electrode 11 and the negative electrode 12, a non-aqueous electrolyte, insulating plates 18 and 19 that are disposed on upper and lower sides of the electrode assembly 14, respectively, and a battery case 15 housing the members. The battery case 15 includes a bottomed cylindrical case body 16 and a sealing assembly 17 for closing an opening of the case body 16. In addition, examples of the battery case 15 include a metal case having a cylindrical shape, a square shape, or the like and a resin case formed by laminating resin sheets (so-called laminate type).

The case body 16 is, for example, a bottomed cylindrical metal container. A gasket 28 is provided between the case body 16 and the sealing assembly 17 to secure a sealing property of the inside of the battery. The case body 16 has, for example, a projecting portion 22 in which a part of a side part thereof projects inside for supporting the sealing assembly 17. The projecting portion 22 is preferably formed in an annular shape along a circumferential direction of the case body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the non-aqueous electrolyte secondary battery 10 illustrated in FIG. 1, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case body 16 by welding or the like, and the case body 16 becomes a negative electrode terminal.

The positive electrode 11 includes, for example, a positive electrode current collector and a positive electrode active material layer provided on the positive electrode current collector. As the positive electrode current collector, for example, a foil of a metal stable in a potential range of the positive electrode, such as aluminum, a film in which the metal is disposed on a surface layer, or the like can be used. In addition, it is preferable that the positive electrode active material layer contains a positive electrode active material and contains a conductive agent or a binder.

Examples of the positive electrode active material include lithium transition metal composite oxides. Specifically, lithium cobaltate, lithium manganate, lithium nickelate, lithium nickel manganese composite oxide, lithium nickel cobalt composite oxide, and the like can be used, and Al, Ti, Zr, Nb, B, W, Mg, Mo, and the like may be added to these lithium transition metal composite oxides.

As the conductive agent, carbon powders such as carbon black, acetylene black, Ketjenblack, and graphite may be used alone or in combination of two or more thereof.

Examples of the binder include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These materials may be used alone or in combination of two or more thereof.

The negative electrode 12 includes, for example, a negative electrode current collector and a negative electrode active material layer provided on the negative electrode current collector. As the negative electrode current collector, for example, a foil of a metal stable in a potential range of the negative electrode, such as copper, a film in which the metal is disposed on a surface layer, or the like can be used. In addition, it is preferable that the negative electrode active material layer contains a negative electrode active material and contains a binder and the like.

As the negative electrode active material, a carbon material capable of occluding and releasing lithium ions can be used, and in addition to graphite, non-graphitizable carbon, graphitizable carbon, fibrous carbon, coke, carbon black, and the like can be used. Furthermore, as a non-carbon-based material, silicon, tin, and a metal or an oxide mainly containing silicon and tin can be used.

Examples of the binder include a fluorine-based resin, PAN, a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof, and polyvinyl alcohol (PVA). These materials may be used alone or in combination of two or more thereof.

Figure 2:
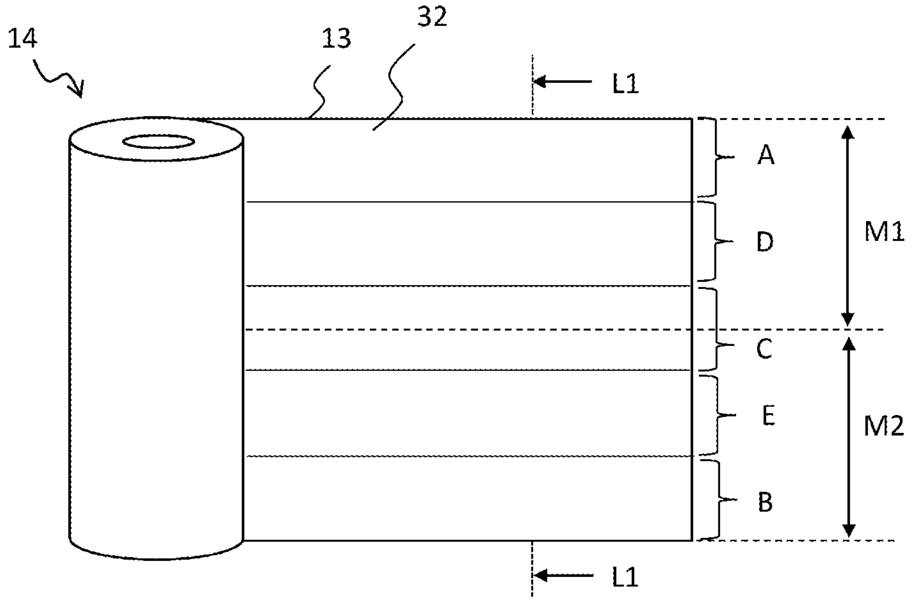
FIG. 2 is a schematic perspective view of a wound electrode assembly used in the non-aqueous electrolyte secondary battery of FIG. 1.
Figure 3:
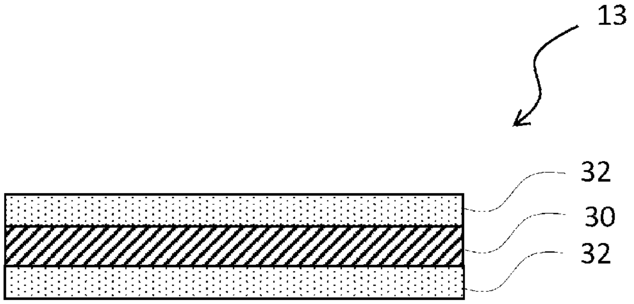
FIG. 3 is a schematic cross-sectional view of a separator taken along line L1-L1 in FIG. 2.

FIG. 2 is a schematic perspective view of a wound electrode assembly used in the non-aqueous electrolyte secondary battery of FIG. 1. However, in FIG. 2, in order to facilitate the description of the configuration of the separator, a part (winding end portion) of the separator to be wound around the electrode assembly 14 is shown in a state before winding. FIG. 3 is a schematic cross-sectional view of a separator taken along line L1-L1 in FIG. 2.

As illustrated in FIG. 3, the separator 13 includes a porous substrate 30 and a heat-resistant porous layer 32 disposed on each of both surfaces of the porous substrate 30. The heat-resistant porous layer 32 disposed on one surface of the porous substrate 30 faces the positive electrode 11, and the heat-resistant porous layer 32 disposed on the other surface of the porous substrate 30 faces the negative electrode 12. The separator 13 is designed to have a larger width and length than those of the positive electrode 11 or the negative electrode 12 in order to prevent a short circuit between the positive and negative electrodes. Therefore, when the positive electrode 11, the negative electrode 12, and the separator 13 are overlapped in manufacturing the electrode assembly 14, the separator 13 protrudes from the positive electrode 11 or the negative electrode 12. It is preferable that the heat-resistant porous layer 32 of the present embodiment is disposed on at least one surface of the porous substrate 30 and faces at least the positive electrode 11 from the viewpoint of improving the charge and discharge cycle characteristics or safety of the battery.

The electrode assembly 14 illustrated in FIG. 2 is wound in a longitudinal direction of the positive electrode 11, the negative electrode 12, and the separator 13. Here, in the present specification, the longitudinal direction of the separator 13 corresponds to a winding direction of the electrode assembly 14, and a width direction of the separator 13 corresponds to a winding axis direction of the electrode assembly 14. As illustrated in FIG. 2, the separator 13 is divided into five regions (a region A, a region B, a region C, a region D, and a region E) extending in the longitudinal direction by dividing the separator 13 into five regions in the width direction. The region A is positioned at one end of the separator 13 in the width direction, the region B is positioned at the other end of the separator 13 in the width direction, the region C is positioned at the center portion of the separator 13 in the width direction, the region D is positioned between the A and the region C, and the region E is positioned between the region B and the region C.

In the separator 13 illustrated in FIG. 2, a porosity of each of the region D and the region E is configured to be larger than a porosity of each of the region A, the region B, and the region C. The porosity of each region refers to the porosity of the separator 13 in each region. In general, when charging and discharging of the battery are repeatedly performed, a gradient occurs in a non-aqueous electrolytic mass of the positive electrode and the negative electrode in the width direction, and it becomes difficult to perform a uniform charge and discharge reaction between the positive electrode and the negative electrode as a whole, such that the charge and discharge cycle characteristics are likely to be deteriorated. Therefore, as a result of intensive studies by the present inventors, it has been found that when the porosity of each of the region D and the region E is larger than the porosity of each of the region A, the region B, and the region C, the retention amount of the non-aqueous electrolyte in the entire separator 13 can be set to be uniform even when charging and discharging are repeated. As a result, even when charging and discharging are repeatedly performed, for example, the occurrence of the gradient in the non-aqueous electrolytic mass of the positive electrode and the negative electrode in the width direction is suppressed, the charge and discharge reaction between the positive electrode and the negative electrode as a whole can be made uniform, and the effect of suppressing the deterioration of the charge and discharge cycle characteristics is exhibited.

The porosity of the separator 13 in each region is adjusted by adjusting at least one of the porosity of the porous substrate 30 and the porosity of the heat-resistant porous layer 32, but is preferably adjusted by adjusting the porosity of the heat-resistant porous layer 32 from the viewpoint of easy adjustment of the porosity for each region. Therefore, the porosity in each region will be described below as the porosity of the heat-resistant porous layer 32 in each region. The porosity of the heat-resistant porous layer 32 in each region is calculated by the following equations.

Porosity(%)={(Apparent volume of heat-resistant porous layer 32 in each region−sum of actual volumes of respective components of heat-resistant porous layer 32 in each region)/(Apparent volume of heat-resistant porous layer 32 in each region)}×100

Apparent volume of heat-resistant porous layer 32 in each region=Measured thickness of heat-resistant porous layer 32 in each region×area Actual volume of each component of heat-resistant porous layer 32 in each region=Mass of each component contained in heat-resistant porous layer 32 in each region/True density In a case where the porosity of the separator 13 is calculated, the heat-resistant porous layer 32 in the above equations may be replaced with the separator 13.

The region D is preferably positioned at greater than or equal to 30% and less than or equal to 90% of a width (M1 illustrated in FIG. 2) from one end to the center portion of the separator 13 in the width direction. In addition, the region E is preferably positioned at greater than or equal to 30% and less than or equal to 90% of a width (M2 illustrated in FIG. 2) from the other end to the center portion of the separator 13 in the width direction. When the regions D and E satisfy the above ranges, the regions D and E are appropriately spaced from both ends of the separator 13 in the width direction, and thus, for example, the retention amount of the non-aqueous electrolyte in the entire separator 13 can be set to be more uniform as compared with a case of deviating from the above ranges, and the deterioration of the charge and discharge cycle characteristics is further suppressed.

A ratio of a width of the region D to the width (M1 illustrated in FIG. 2) from one end to the center portion of the separator 13 in the width direction is, for example, preferably greater than or equal to 20% and less than or equal to 60%, and more preferably greater than or equal to 30% and less than or equal to 50%, from the viewpoint of further suppressing the deterioration of the charge and discharge cycle characteristics. In addition, a ratio of a width of the region E to the width (M2 illustrated in FIG. 2) from the other end to the center portion of the separator 13 in the width direction is preferably greater than or equal to 20% and less than or equal to 60%, and more preferably greater than or equal to 30% and less than or equal to 50%, from the viewpoint of further suppressing the deterioration of the charge and discharge cycle characteristics.

A ratio of a width of the region A to the width from one end to the center portion of the separator 13 in the width direction is, for example, preferably greater than or equal to 20% and less than or equal to 70%. In addition, a ratio of a width of the region B to the width from the other end to the center portion of the separator 13 in the width direction is, for example, preferably greater than or equal to 20% and less than or equal to 70%. In addition, a ratio of a width of the region C to the width from one end (or the other end) to the center portion of the separator in the width direction is, for example, preferably greater than or equal to 10% and less than or equal to 50%.

The porous substrate 30 is formed of, for example, a micro-porous thin film, a woven fabric, a non-woven fabric, or the like. A material of the porous substrate 30 is not particularly limited, and examples thereof include polyethylene, polypropylene, a polyolefin such as a copolymer of polyethylene and an α-olefin, an acrylic resin, polystyrene, polyester, and cellulose. The porous substrate 30 may have a single-layered structure or a multi-layered structure. A thickness of the porous substrate 30 is not particularly limited, and is preferably, for example, in a range of greater than or equal to 3 μm and less than or equal to 20 μm.

An average pore diameter of the porous substrate 30 is preferably in a range of greater than or equal to 0.02 μm and less than or equal to 0.5 μm, and is more preferably in a range of greater than or equal to 0.03 μm and less than or equal to 0.3 μm. The average pore diameter of the porous substrate 30 is measured using a perm-porometer (manufactured by SEIKA CORPORATION) capable of measuring a fine pore diameter by a bubble point method (JIS K3832, ASTM F316-86).

A porosity of the porous substrate 30 is preferably, for example, in a range of greater than or equal to 30% and less than or equal to 80%, from the viewpoint of a lithium ion permeation property and the like. The porosity of the porous substrate 30 may be calculated by replacing the heat-resistant porous layer 32 in the above equations with the porous substrate 30.

The heat-resistant porous layer 32 contains, for example, a filler and a binder. A thickness of the heat-resistant porous layer 32 is not particularly limited, and is preferably, for example, in a range of greater than or equal to 1 μm and less than or equal to 10 μm.

When a filler is contained in the heat-resistant porous layer 32, for example, the effect of suppressing a thermal shrinkage can be imparted to the heat-resistant porous layer 32. For example, a melting point or a thermal softening point of the filler is preferably higher than or equal to 150° C. and more preferably higher than or equal to 200° C. Examples of the filler include metal oxide particles, metal nitride particles, metal fluoride particles, and metal carbide particles. Examples of the metal oxide particles include aluminum oxide, titanium oxide, magnesium oxide, zirconium oxide, nickel oxide, silicon oxide, and manganese oxide particles. Examples of the metal nitride particles include titanium nitride, boron nitride, aluminum nitride, magnesium nitride, and silicon nitride particles. Examples of the metal fluoride particles include aluminum fluoride, lithium fluoride, sodium fluoride, magnesium fluoride, calcium fluoride, and barium fluoride particles. Examples of the metal carbide particles include silicon carbide, boron carbide, titanium carbide, and tungsten carbide particles. In addition, the filler may be porous aluminosilicate such as zeolite ($M_{2/n}O \cdot Al_2O_3 \cdot xSiO_2 \cdot yH_2O$, M is a metal element, x≥2, y≥0) or the like, layered silicate such as talc ($Mg_3Si_4O_{10}(OH)_2$) or the like, or a mineral such as barium titanate ($BaTiO_3$), strontium titanate ($SrTiO_3$), or the like. Note that these materials may be used alone or in combination of two or more thereof.

A BET specific surface area of the filler is not particularly limited, and for example, is preferably in a range of greater than or equal to 1 $m^2/g$ and less than or equal to 20 $m^2/g$, and is more preferably in a range of greater than or equal to 3 $m^2/g$ and less than or equal to 15 $m^2/g$. An average particle size of the filler is not particularly limited, and for example, is preferably greater than or equal to 0.1 μm and less than or equal to 5 μm, and is more preferably in a range of greater than or equal to 0.2 μm and less than or equal to 1 μm.

A content of the filler is, for example, preferably in a range of greater than or equal to 70 mass % and less than or equal to 95 mass % with respect to the total amount of heat-resistant porous layer 32.

The binder has a function of bonding the individual fillers to each other and the filler to the porous substrate 30. Peel strength between the porous substrate 30 and the heat-resistant porous layer 32 is improved by the binder. Examples of the binder include a fluorine-based resin such as polyvinylidene fluoride (PVDF) or polytetrafluoroethylene (PTFE), a polyimide-based resin, an acrylic resin, a polyolefin-based resin, styrene-butadiene rubber (SBR), nitrile-butadiene rubber (NBR), carboxymethyl cellulose (CMC) or a salt thereof, polyacrylic acid (PAA) or a salt thereof, and polyvinyl alcohol (PVA). These materials may be used alone or in combination of two or more thereof.

A content of the binder is, for example, preferably in a range of greater than or equal to 5 mass % and less than or equal to 15 mass % with respect to the total amount of heat-resistant porous layer 32.

The porosity of the heat-resistant porous layer 32 can be adjusted, for example, by changing the ratio between the filler and the binder. For example, when the ratio of the filler is increased, a heat-resistant porous layer 32 having a high porosity can be formed.

An example of a method of manufacturing the heat-resistant porous layer 32 will be described. For example, a first slurry containing a filler and a binder and having a low filler content and a second slurry containing a filler and a binder and having a high filler content are prepared. Then, the first slurry is applied to the surface of the porous substrate corresponding to the region A, the region B, and the region C, the second slurry is applied to the surface of the porous substrate corresponding to the region D and the region E, and then drying is performed. Therefore, the heat-resistant porous layer 32 in which the porosity of each of the region D and the region E is higher than the porosity of each of the region A, the region B and the region C can be formed on the surface of the porous substrate 30. In addition, the porosity of the heat-resistant porous layer 32 can also be adjusted by changing the material of the filler or the binder.

The non-aqueous electrolyte contains a non-aqueous solvent and an electrolyte salt dissolved in the non-aqueous solvent. As the non-aqueous solvent, for example, esters, ethers, nitriles such as acetonitrile, amides such as dimethylformamide, a mixed solvent of two or more thereof, and the like can be used. The non-aqueous solvent may contain a halogen-substituted product in which at least some hydrogens in these solvents are substituted with halogen atoms such as fluorine.

Examples of the esters include cyclic carbonates such as ethylene carbonate (EC), propylene carbonate (PC), and butylene carbonate, chain carbonates such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters such as γ-butyrolactone and γ-valerolactone, and chain carboxylic acid esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogen-substituted product, fluorinated cyclic carbonate ester such as fluoroethylene carbonate (FEC), fluorinated chain carboxylic acid ester such fluorinated chain carbonate ester or methyl fluoropropionate (FMP), and the like are preferably used.

The electrolyte salt is preferably a lithium salt. Examples of the lithium salt include borates such as $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, lithium chloroborane, lithium lower aliphatic carboxylate, $Li_2B_4O_7$, and $Li(B(C_2O_4)F_2)$, and imide salts such as $LiN(SO_2CF_3)_2$ and $LiN(C_1F_{2l+1}SO_2)(C_mF_{2m+1}SO_2)$ {l and m are integers greater than or equal to 1}. These lithium salts may be used alone or in combination of multiple types. Among them, $LiPF_6$ is preferably used from the viewpoint of ion conductivity, electrochemical stability, and the like. A concentration of the lithium salt is preferably greater than or equal to 0.8 mol and less than or equal to 1.8 mol per 1 L of the solvent.

Next, Examples will be described.

EXAMPLES

Example 1

[Manufacturing of Positive Electrode]

94 parts by mass of a positive electrode active material represented by $LiNi_{0.85}Co_{0.12}Al_{0.03}O_2$, 3 parts by mass of a carbon powder as a conductive agent, and 3 parts by mass of polyvinylidene fluoride as a binder were mixed, and the mixture and N-methyl-2-pyrrolidone were wet-mixed in a dry environment to prepare a positive electrode mixture slurry. The positive electrode mixture slurry was applied to both surfaces of an aluminum foil having a thickness of 15 μm, drying was performed, and then rolling was performed using a roller. Therefore, a positive electrode having a width of 65 mm and a length of 950 mm in which positive electrode active material layers were formed on both surfaces of the positive electrode current collector was obtained.

[Manufacturing of Negative Electrode]

94 parts by mass of a graphite powder, 3 parts by mass of Si oxide, and 3 parts by mass of a polyvinylidene fluoride powder were mixed, and the mixture and N-methyl-2-pyrrolidone were mixed to prepare a negative electrode mixture slurry. The negative electrode mixture slurry was applied to both surfaces of a copper foil, drying was performed, and then rolling was performed using a roller. Therefore, a negative electrode having a width of 65 mm and a length of 1,000 mm in which negative electrode active material layers were formed on both surfaces of the negative electrode current collector was obtained.

[Manufacturing of Separator]

A first slurry in which alumina particles and an aramid resin were mixed at a predetermined ratio was prepared. In addition, a second slurry in which a ratio of alumina particles was increased from that of the first slurry was prepared. The first slurry and the second slurry were applied to one surface of a polyethylene porous substrate (a thickness of 10 μm). Specifically, the first slurry was applied to one surface of the porous substrate corresponding to the region A, the region B, and the region C illustrated in FIG. 2, the second slurry was applied to the surface of the porous substrate corresponding to the region D and the region E illustrated in FIG. 2, and then drying was performed. The region D to which the second slurry was applied was set at a position of greater than or equal to 40% and less than or equal to 80% of the width from one end to the center portion of the separator in the width direction, and the region E to which the second slurry was applied was set at a position of greater than or equal to 40% and less than or equal to 80% of the width from the other end to the center portion of the separator in the width direction. As described above, a separator having a width of 67 mm and a length of 1,100 mm in which a heat-resistant porous layer having a thickness of 3 μm was formed on one surface of the porous substrate was obtained.

The porosity of the heat-resistant porous layer in each of the region A, the region B, and the region C of the obtained separator was 70%, and the porosity of the heat-resistant porous layer in each of the region D and the region E was 75%.

[Preparation of Non-Aqueous Electrolyte]

A non-aqueous electrolyte was prepared by dissolving 1 mol/liter of $LiPF_6$ in a mixed solvent in which ethylene carbonate and methyl ethyl carbonate were mixed at a volume ratio of 30:70.

[Manufacturing of Non-Aqueous Electrolyte Secondary Battery]

(1) A positive electrode lead was attached to a positive electrode current collector, and a negative electrode lead was attached to a negative electrode current collector. Then, the separator was disposed between the positive electrode and the negative electrode so that the heat-resistant porous layer of the separator faced the positive electrode. Thereafter, these components were wound to manufacture a wound electrode assembly.

(2) Insulating plates were disposed on upper and lower sides of the electrode assembly, respectively, the negative electrode lead was welded to a case body, the positive electrode lead was welded to a sealing assembly, and the electrode assembly was housed in the case body.

(3) A non-aqueous electrolyte was injected into the case body, and then, an end part of an opening of the case body was sealed with the sealing assembly via a gasket. This was used as a non-aqueous electrolyte secondary battery.

Comparative Example 1

A non-aqueous electrolyte secondary battery was manufactured in the same manner as that of Example 1, except that the entire one surface of the porous substrate was coated with the first slurry in the manufacturing of the separator. The porosity of the heat-resistant porous layer in each of the region A to the region E of the separator was 70%.

Comparative Example 2

A non-aqueous electrolyte secondary battery was manufactured in the same manner as that of Example 1, except that the entire one surface of the porous substrate was coated with the second slurry in the manufacturing of the separator. The porosity of the heat-resistant porous layer in each of the region A to the region E of the separator was 75%.

Comparative Example 3

A non-aqueous electrolyte secondary battery was manufactured in the same manner as that of Example 1, except that the first slurry was applied to one surface of the porous substrate corresponding to the region A and the region B and the second slurry was applied to the surface of the porous substrate corresponding to the region C, the region D, and the region E in the manufacturing of the separator. The porosity of the heat-resistant porous layer in each of the region A and the region B of the separator was 70%, and the porosity of the heat-resistant porous layer in each of the region C, the region D, and the region E was 75%.

[Charge and Discharge Cycle Characteristics]

The non-aqueous electrolyte secondary battery of each Example and each Comparative Example was subjected to constant current charge (a current of 1,500 mA and an end voltage of 4.2 V)-constant voltage charge (a voltage of 4.2 V and an end current of 90 mA) in a temperature environment of 25° C., and then the non-aqueous electrolyte secondary battery was subjected to constant current discharge (a current of 2,250 mA and an end voltage of 2.5 V). The charge and discharge cycle was performed 700 cycles, and a capacity retention rate was determined. The results are summarized in Table 1.

Capacity retention rate (%)=(700th cycle discharge capacity/1st cycle discharge capacity)×100

TABLE 1

| | Porosity | | | | | Positions of regions D and E | Electrode facing heat-resistant porous layer | Capacity retention rate |
|---|---|---|---|---|---|---|---|---|
| | Region A | Region D | Region C | Region E | Region B | | | |
| Example 1 | 70% | 75% | 70% | 75% | 70% | 40%-80% | Positive electrode | 75% |
| Comparative Example 1 | 70% | 70% | 70% | 70% | 70% | — | Positive electrode | 40% |
| Comparative Example 2 | 75% | 75% | 75% | 75% | 75% | — | Positive electrode | 45% |

TABLE 1-continued

| | Porosity | | | | | Positions of | Electrode facing heat- | |
|---|---|---|---|---|---|---|---|---|
| | Region A | Region D | Region C | Region E | Region B | regions D and E | resistant porous layer | Capacity retention rate |
| Comparative Example 3 | 70% | 75% | 75% | 75% | 70% | — | Positive electrode | 50% |

As shown in Table 1, Example 1 exhibited a higher capacity retention rate than that in Comparative Examples 1 to 3. From this result, it can be said that deterioration of charge and discharge cycle characteristics can be suppressed by using a separator in which the porosity of each of the region D and the region E is larger than the porosity of each of the region A, the region B, and the region C.

Example 2

A non-aqueous electrolyte secondary battery was manufactured in the same manner as that of Example 1, except that the region D to which the second slurry was applied was set at a position of greater than or equal to 30% and less than or equal to 90% of the width from one end to the center portion of the separator in the width direction, and the region E to which the second slurry was applied was set at a position of greater than or equal to 30% and less than or equal to 90% of the width from the other end to the center portion of the separator in the width direction, and charge and discharge cycle characteristics were evaluated.

Example 3

A non-aqueous electrolyte secondary battery was manufactured in the same manner as that of Example 1, except that the region D to which the second slurry was applied was set at a position of greater than or equal to 20% and less than or equal to 70% of the width from one end to the center portion of the separator in the width direction, and the region E to which the second slurry was applied was set at a position of greater than or equal to 20% and less than or equal to 70% of the width from the other end to the center portion of the separator in the width direction, and charge and discharge cycle characteristics were evaluated.

Example 4

A non-aqueous electrolyte secondary battery was manufactured in the same manner as that of Example 1, except that the region D to which the second slurry was applied was set at a position of greater than or equal to 45% and less than or equal to 95% of the width from one end to the center portion of the separator in the width direction, and the region E to which the second slurry was applied was set at a position of greater than or equal to 45% and less than or equal to 95% of the width from the other end to the center portion of the separator in the width direction, and charge and discharge cycle characteristics were evaluated.

The results of the capacity retention rates in Examples 1 to 4 are summarized in Table 2.

TABLE 2

| | Porosity | | | | | Positions of | Electrode facing heat- | |
|---|---|---|---|---|---|---|---|---|
| | Region A | Region D | Region C | Region E | Region B | regions D and E | resistant porous layer | Capacity retention rate |
| Example 1 | 70% | 75% | 70% | 75% | 70% | 40%-80% | Positive electrode | 75% |
| Example 2 | 70% | 75% | 70% | 75% | 70% | 30%-90% | Positive electrode | 70% |
| Example 3 | 70% | 75% | 70% | 75% | 70% | 20%-70% | Positive electrode | 60% |
| Example 4 | 70% | 75% | 70% | 75% | 70% | 45%-95% | Positive electrode | 55% |

As shown in Table 2, Example 1 exhibited a higher capacity retention rate than that in Examples 2 to 4. From this result, it can be said that deterioration of charge and discharge cycle characteristics can be further suppressed by using the separator in which the region D having a high porosity is positioned at greater than or equal to 30% and less than or equal to 90% of the width from one end to the center portion of the separator in the width direction, and the region E having a high porosity is positioned at greater than or equal to 30% and less than or equal to 90% of the width from the other end to the center portion of the separator in the width direction.

Example 5

A non-aqueous electrolyte secondary battery was manufactured in the same manner as that of Example 1, except that the separator was disposed between the positive electrode and the negative electrode so that the heat-resistant porous layer of the separator faced the negative electrode, and charge and discharge cycle characteristics were evaluated.

Example 6

A non-aqueous electrolyte secondary battery was manufactured in the same manner as that of Example 1, except that the first slurry was applied to both surfaces of the porous substrate corresponding to the region A, the region B, and the region C and the second slurry was applied to both surfaces of the porous substrate corresponding to the region D and the region E, and charge and discharge cycle characteristics were evaluated.

The results of the capacity retention rates in Examples 1, 5, and 6 are summarized in Table 3.

TABLE 3

| | Porosity | | | | | Positions of | Electrode facing heat- | |
|---|---|---|---|---|---|---|---|---|
| | Region A | Region D | Region C | Region E | Region B | regions D and E | resistant porous layer | Capacity retention rate |
| Example 1 | 70% | 75% | 70% | 75% | 70% | 40%-80% | Positive electrode | 75% |
| Example 5 | 70% | 75% | 70% | 75% | 70% | 40%-80% | Negative electrode | 70% |
| Example 6 | 70% | 75% | 70% | 75% | 70% | 40%-80% | Positive electrode and negative electrode | 75% |

As shown in Table 3, Examples 1 and 6 exhibited a higher capacity retention rate than that in Example 5. As a result, the heat-resistant porous layer preferably faces at least the positive electrode.

REFERENCE SIGNS LIST

10 Non-aqueous electrolyte secondary battery
11 Positive electrode
12 Negative electrode
13 Separator
14 Electrode assembly
15 Battery case
16 Case body
17 Sealing assembly
18, 19 Insulating plate
20 Positive electrode lead
21 Negative electrode lead
22 Projecting portion
23 Filter
24 Lower vent member
25 Insulating member
26 Upper vent member
27 Cap
28 Gasket
30 Porous substrate
32 Heat-resistant porous layer

The invention claimed is:

1. A non-aqueous electrolyte secondary battery comprising:

a wound electrode assembly in which a positive electrode and a negative electrode are wound with a separator interposed therebetween; and a non-aqueous electrolyte, wherein the separator includes a porous substrate and a heat-resistant porous layer disposed on the porous substrate and facing at least one of the positive electrode and the negative electrode, the heat-resistant porous layer contains inorganic filler particles and a binder, and in a case where the separator is divided into five regions in a width direction and the five divided regions are defined as a region A positioned at one end of the separator in the width direction, a region B positioned at the other end of the separator in the width direction, a region C positioned at the center portion of the separator in the width direction, a region D positioned between the region A and the region C, and a region E positioned between the region B and the region C, a porosity of the heat-resistant porous layer in each of the region D and the region E is larger than a porosity of the heat-resistant porous layer in each of the region A, the region B and the region C, and a ratio of the inorganic filler particles of the heat-resistant porous layer in each of the region D and the region E is higher than a ratio of the inorganic filler particles of the heat-resistant porous layer in each of the region A, the region B and the region C.

2. The non-aqueous electrolyte secondary battery according to claim 1, wherein the region D is positioned at greater than or equal to 30% and less than or equal to 90% of a width from the one end to the center portion of the separator in the width direction, and the region E is positioned at greater than or equal to 30% and less than or equal to 90% of a width from the other end to the center portion of the separator in the width direction.

3. The non-aqueous electrolyte secondary battery according to claim 1, wherein the heat-resistant porous layer faces at least the positive electrode.

* * * * *